United States Patent
Fawzy

(10) Patent No.: US 10,868,909 B1
(45) Date of Patent: Dec. 15, 2020

(54) SWITCHED TELEPHONE NETWORK AND METHOD FOR MANAGING A SUBSCRIBER LINE IN SUCH A NETWORK

(71) Applicant: Anas Fawzy, Paris (FR)

(72) Inventor: Anas Fawzy, Paris (FR)

(*) Notice: Subject to any disclaimer, the term of this patent is extended or adjusted under 35 U.S.C. 154(b) by 0 days.

(21) Appl. No.: 16/635,286

(22) PCT Filed: Aug. 1, 2018

(86) PCT No.: PCT/FR2018/051982
§ 371 (c)(1),
(2) Date: Jan. 30, 2020

(87) PCT Pub. No.: WO2019/025731
PCT Pub. Date: Feb. 7, 2019

(30) Foreign Application Priority Data

Aug. 4, 2017 (FR) .................................. 17 57522

(51) Int. Cl.
*H04M 3/42* (2006.01)
*H04M 3/54* (2006.01)
*H04M 1/725* (2006.01)

(52) U.S. Cl.
CPC ... *H04M 3/42263* (2013.01); *H04M 3/42238* (2013.01); *H04M 3/548* (2013.01);
(Continued)

(58) Field of Classification Search
CPC ......... H04M 3/42263; H04M 3/42238; H04M 3/548; H04M 2203/2005; H04M 1/72519; H04M 1/72522
(Continued)

(56) References Cited

U.S. PATENT DOCUMENTS 5,390,241 A * 2/1995 Bales .................. H04M 3/4228
370/264
5,530,951 A * 6/1996 Argintar .................. H04M 1/72
379/100.12

(Continued)

FOREIGN PATENT DOCUMENTS

GB 2440 813 A 2/2008
WO 96/39786 A2 12/1996

OTHER PUBLICATIONS

International Search Report dated Nov. 26, 2018 in corresponding International application No. PCT/FR2018/051982; 4 pages.

*Primary Examiner* — Danh C Le
(74) *Attorney, Agent, or Firm* — Maier & Maier, PLLC

(57) ABSTRACT

A switched telephone network where a first switch is connected to a first subscriber line for connection to a first landline telephone installed for a first subscriber, the first subscriber line associated with a number assigned to the first telephone, a second switch including a database where a telephone number assigned to a second landline telephone of a second subscriber is stored, a removable housing connected to the first subscriber line, where the first telephone is installed, the second telephone connected to the housing, transmitting, to the first switch, a presence request containing the number assigned to the second telephone, the reception of the presence request by the first switch results implementation of a logical computer process involving the second switch and resulting in sharing of the first subscriber line, through the housing, between the number assigned to the first telephone and the number assigned to the second telephone.

15 Claims, 7 Drawing Sheets

(52) U.S. Cl.
CPC .... *H04M 1/72519* (2013.01); *H04M 1/72522* (2013.01); *H04M 2203/2005* (2013.01)

(58) Field of Classification Search
USPC ..................................... 455/417, 550.1, 418
See application file for complete search history.

(56) References Cited

U.S. PATENT DOCUMENTS

| | | | | |
|---|---|---|---|---|
| 5,579,386 | A * | 11/1996 | Koda | H04M 19/02 |
| | | | | 379/142.13 |
| 6,574,316 | B1 * | 6/2003 | Malik | H04M 15/00 |
| | | | | 379/111 |
| 6,690,933 | B1 * | 2/2004 | Chapman, Jr. | H04W 4/24 |
| | | | | 455/414.1 |
| 6,888,936 | B1 * | 5/2005 | Groen | H04M 3/42 |
| | | | | 379/142.1 |
| 6,940,968 | B1 * | 9/2005 | Lipton | H04M 1/6033 |
| | | | | 379/388.01 |
| 2004/0264669 | A1 * | 12/2004 | Denny | H04M 3/56 |
| | | | | 379/219 |
| 2009/0296906 | A1 * | 12/2009 | Kuroda | H04M 7/0027 |
| | | | | 379/201.01 |
| 2010/0080369 | A1 * | 4/2010 | Hurst | G06F 16/24575 |
| | | | | 379/112.01 |
| 2013/0163750 | A1 * | 6/2013 | Huang | H04B 3/542 |
| | | | | 379/413 |
| 2014/0056416 | A1 * | 2/2014 | Savaglio | H04M 3/5116 |
| | | | | 379/45 |

* cited by examiner

SWITCHED TELEPHONE NETWORK AND METHOD FOR MANAGING A SUBSCRIBER LINE IN SUCH A NETWORK

FIELD

The invention aims for a switched telephone network. It also aims for a method for managing a subscriber line in a switched telephone network and a housing for the implementation of this method.

It concerns, in particular, the technical field of switched telephone network architectures, making it possible mainly for subscribers to emit and/or receive telephone calls from a landline telephone and making it possible, secondarily, for subscribers to recover other private internet connection attributes to access complementary services.

BACKGROUND

The Switched Telephone Network (STN) makes it possible to connect two subscriber lines. It is the historic network of landline telephones. FIG. 1 schematizes the arrangement of the main elements that constitute an STN known to a person skilled in the art. The STN is organized into three sub-portions: switching, distribution and transmission.

The switching makes it possible for the temporary connection between the subscriber lines.

The distribution makes it possible to connect the subscriber landline telephones to a switch. This connection can be analogue or digital.

As an illustrative example, in the STN of FIG. 1, the switch $C_1$ is connected to the landline telephone $T_A$ of a subscriber A by a subscriber line $L_A$ and to the landline telephone $T_B$ of a subscriber B by a subscriber line $L_B$. The switch $C_2$ is connected to the landline telephone $T_C$ of a subscriber C by a subscriber line $L_C$ and to the landline telephone $T_D$ of a subscriber D by a subscriber line $L_B$. The switch $C_3$ is connected to the landline telephone $T_E$ of a subscriber E by a subscriber line $L_E$ and to the landline telephone $T_F$ of a subscriber F by a subscriber line $L_F$. Each subscriber line is associated with a telephone number assigned to the corresponding landline telephone: the subscriber line $L_A$ is associated with the telephone number of the landline telephone $T_A$, the subscriber line $L_B$ is associated with the telephone number of the landline telephone $T_B$, the subscriber line $L_C$ is associated with the telephone number of the landline telephone $T_C$, the subscriber line $L_D$ is associated with the telephone number of the landline telephone TD, the subscriber line $L_E$ is associated with the telephone number of the landline telephone $T_E$ and the subscriber line $L_F$ is associated with the telephone number of the landline telephone $T_F$.

The transmission makes it possible to connect the switches $C_1$, $C_2$, $C_3$ together by means of switching lines $L_{12}$, $L_{13}$, $L_{23}$, which can consist of optical fibers, broadcasters, pairs of copper wires, etc.

As an illustrative example, the subscriber C connected to a switch $C_2$ wants to call the subscriber E connected to a switch $C_3$.

The subscriber C picks up their telephone $T_C$ with the intention of calling their correspondent E. The switch $C_2$ detects that the telephone has been picked up and alerts the subscriber C, by a continuous tone.

The subscriber C dials the telephone number of the subscriber E. This numbering leads to, for example, calibrated line cutoffs or signal transmission (each figure could be encoded by a pair of frequencies) on the subscriber line $L_C$.

The switch $C_2$ decodes and analyzes this signaling to determine if the telephone number of the subscriber E is complete. As soon as is the case, the switch $C_2$ determines the destination of the call. The first figures of the dialed number generally give the routing address of the switch $C_3$.

After having localized the switch $C_3$, the switch $C_2$ establishes with it, a temporary switched connection $L_{23}$, digital or analogue, and transmits to it the telephone number of the subscriber E. The switch $C_3$ analyzes the number transmitted and detects that the call is intended for the subscriber E. To this end, each switch is provided with a database comprising a table wherein are associated, the telephone number, of which they manage and have the corresponding subscriber lines.

When the subscriber E is available (i.e. that their telephone $T_E$ is not engaged), the switch $C_3$ sends back a signaling message to the switch $C_2$, through the switched connection $L_{23}$, indicating the progression of the call. The switch $C_2$ reserves a connection $CO_C$ between the switched connection $L_{23}$ and the subscriber line $L_C$. Likewise, the switch $C_3$ reserves a connection $CO_E$ between the switched connection $L_{23}$ and the subscriber line $L_E$. The switch $C_3$ also activates the ringing of the telephone $T_E$ and generates a ringtone to the switch $C_2$. The subscriber C then hears the tone corresponding to a ringing return.

When the subscriber E picks up their telephone $T_E$, the switch $C_3$ detects this picking up of the telephone, and transmits to the switch $C_2$ a signal itself signifying the start of the communication: the switch $C_2$ can then start to charge the subscriber C. During the whole communication, the switches $C_2$ and $C_3$ monitor if one of the two participants C or E hangs up, or if a possible failure cuts off the ongoing communication.

In the configuration of FIG. 1, each subscriber line $L_A$, $L_B$, $L_C$, $L_D$, $L_E$, $L_E$ being attached to a physical address (postal address of the dwelling of each subscriber A, B, C, D, E, F), it is considered that to each landline telephone number, a physical address is also attached.

Still as an example, the case is taken where the subscriber A rents all or some of their premises to the subscriber C, this location being, for example, made from a platform of the Airbnb® type. During this period, the subscriber C can no longer receive any calls to their landline telephone $T_C$, and if the subscriber A authorizes them to use their landline telephone $T_A$, it is the subscriber A who will be charged. It is therefore understood that this situation is damaging for the two subscribers A and C.

The returning of calls makes it possible for a called subscriber to return their incoming calls to another landline or mobile telephone. The subscriber C can, for example, ask for their incoming calls returned to the number of the landline telephone $T_A$. The subscriber A must, in this case, communicate their number to the subscriber C, which they can refuse for various reasons. Furthermore, the technique of returning calls does not make it possible to bill the subscriber C when they pass calls from the landline telephone $T_A$.

Patent document GB2440813 (AVAYA TECH LLC) describes a switched telephone network, making it possible for a subscriber associated with a landline to recover their connection attributes onto another landline. The sharing of this other landline however appears complex and not very secure.

Patent document WO96/39786 (ERICSSON) describes a removable housing making it possible to emulate a landline on a wireless terminal. This housing however does not make it possible to share a subscriber line between several lines.

The invention aims to overcome this state of affairs. In particular, an aim of the invention is to make it possible for a subscriber to benefit from the attributes of their landline telephone (telephone number and charge), moreover in their dwelling.

Another aim of the invention is to be able to share, simply and securely, a subscriber line between several landline telephone each having their own telephone number.

SUMMARY

The solution proposed by the invention is a switched telephone network (STN), wherein:
- a first switch is connected to a first subscriber line, suitable for being connected to a first landline telephone installed in a premises of a first subscriber, said first subscriber line being associated with a telephone number assigned to said first telephone,
- a second switch, comprising a database, wherein is stored a telephone number assigned to a second landline telephone of a second subscriber,
- a removable housing connected to the first subscriber line, in the premises where the first telephone is installed, the second telephone being connected to said housing,
- a means for transmitting to the first switch, a presence request containing the telephone number assigned to the second telephone,
- the reception of the presence request by the first switch results in the automatic implementation of a logical computer process involving the second switch and resulting in the sharing of the first subscriber line, through the housing, between the telephone number assigned to the first telephone and the telephone number assigned to the second telephone.

By revisiting the abovementioned example, the subscriber C can now use their own landline telephone, at the subscriber A's property, through the subscriber line of the latter. The subscriber A can continue to use their own landline telephone. The subscriber line is thus easily shared between the two landline telephones which each have their own telephone number. The subscriber line of the subscriber C becomes portable and is no longer only attached to the landline address of said subscriber C. In other words, the telephone number of the subscriber C no longer needs to be attached to a landline or conventional subscriber line but can now be attached to any other landline subscriber line on which the housing is connected.

Other advantageous features of the invention are listed below. Each of these features can be considered individually or in combination with the noteworthy features defined above, and form the subject, if necessary, of one or more divisional patent applications:

Advantageously, the reception of the presence request by the first switch results in the emission of a signal commanding the second switch, such that it sends back to said first switch, the incoming calls corresponding to the telephone number assigned to the second telephone.

The second switch preferably establishes a temporary switched connection between the two switches when said second switch receives an incoming call corresponding to the telephone number assigned to the second telephone.

The presence request can be emitted by the housing through the first subscriber line.

In an embodiment variant, the presence request is emitted by the second switch, in response to a command instruction emitted by a remote computer server. In this case, the command instruction can be emitted by the remote computer server, in response to a signaling and an authentication of the second subscriber to said server.

Advantageously, the reception of the presence request by the first switch results in the emission of a signal commanding the second switch, such that it automatically implements a charging process of the second subscriber when an outgoing call is emitted from the second telephone connected to the housing.

Advantageously, the picking up of the second telephone results in the transmission of a signal emitted by the housing, to the first switch, and through the first subscriber line; the reception of this signal by the first switch results in the automatic implementation of a logical computer process, resulting in the establishment of a temporary switched connection between the two switches, such that the second switch processes outgoing calls emitted from the second telephone connected to the housing.

According to an embodiment, the telephone number assigned to the second telephone is stored in a secure removable support; the housing being equipped with a connection interface suitable for receiving the secure removable support.

Advantageously, the insertion of the secure removable support in the connection interface results in the transmission of the presence request by the housing.

Advantageously, the removal of the secure removable support of the connection interface results in the automatic implementation of a logical computer process leading to the stopping of the sharing of the first subscriber line.

In an embodiment variant, the disconnection of the housing of the first subscriber line results in the automatic implementation of a logical computer process leading to the stopping of the sharing of said first subscriber line.

The housing is advantageously presented in the form of a telephone plug adaptor, and comprises: a male plug suitable for being connected into a female plug of a wall socket situated in the premises of the first subscriber, which wall socket is connected to the first subscriber line; a female plug suitable for receiving the male plug of a T-shaped socket connected to the first telephone; a connector to which is connected the second telephone.

In an embodiment variant, the housing is presented in the form of a telephone plug adaptor, and comprises: a male plug suitable for being connected in a female plug of a wall socket situated in the premises of the first subscriber, which wall socket is connected to the first subscriber line; a connector to which is connected the first telephone; a connector to which is connected the second telephone.

Another aspect of the invention concerns a method for managing a subscriber line in a switched telephone network, which network comprises:
- a first switch connected to a first subscriber line suitable for being connected to a first landline telephone installed in a premises of a first subscriber, said first subscriber line being associated with a telephone number assigned to said first telephone, a second switch comprising a database, wherein is stored a telephone number assigned to a second landline telephone of a second subscriber.

This method comprises steps consisting of:

connecting a removable housing to the first subscriber line, in the premises where the first telephone is installed, connecting the second telephone to the housing, transmitting to the first switch, a presence request containing the telephone number assigned to the second telephone, the reception of the presence request by the first switch results in the automatic implementation of a logical computer process involving the second switch and resulting in the sharing of the first subscriber line, through the housing, between the telephone number assigned to the first telephone and the telephone number assigned to the second telephone.

Also, another aspect of the invention concerns a housing comprising at least one processor and at least one memory wherein is stored at least one computer application, which computer application comprises instruction which, when they are executed by said processor, making it possible to implement the steps of the method defined above.

BRIEF DESCRIPTION OF THE FIGURES

Other advantages and features of the invention will best appear upon reading the description of a following preferred embodiment, in reference to the appended drawings, produced as indicative and non-limiting examples and wherein.

abovementioned FIG. 1 schematizes the arrangement of elements constituting a switched telephone network (STN) known from the prior art, FIG. 2 schematizes the arrangement of different components of a switch.

DETAILED DESCRIPTION

The method, which is the subject of the invention, consists of a coherent sequence of steps, making it possible to result in a desired result. These steps cause manipulations of physical elements, in particular signals (electric or magnetic) capable of being stored, transferred, combined, compared, etc.

The method is implemented by way of computer applications executed by computer devices. For reason of clarity, it is necessary to understand in the sense of the invention, that "the device does something" means "the computer application executed by the processor or microprocessor of the device does something". Just like "the computer application does something" means "the computer application executed by the processor or microprocessor of the device does something".

Also, for reason of clarity, the present invention can make reference to one or more "logical computer processes". The latter correspond to the actions or results obtained by executing instructions of different computer applications. Also, it must also be understood that, in the sense of the invention, that "a logical computer process does something" means "the instructions of one or more computer applications executed by one or more processors or microprocessors do something".

Figure 1:
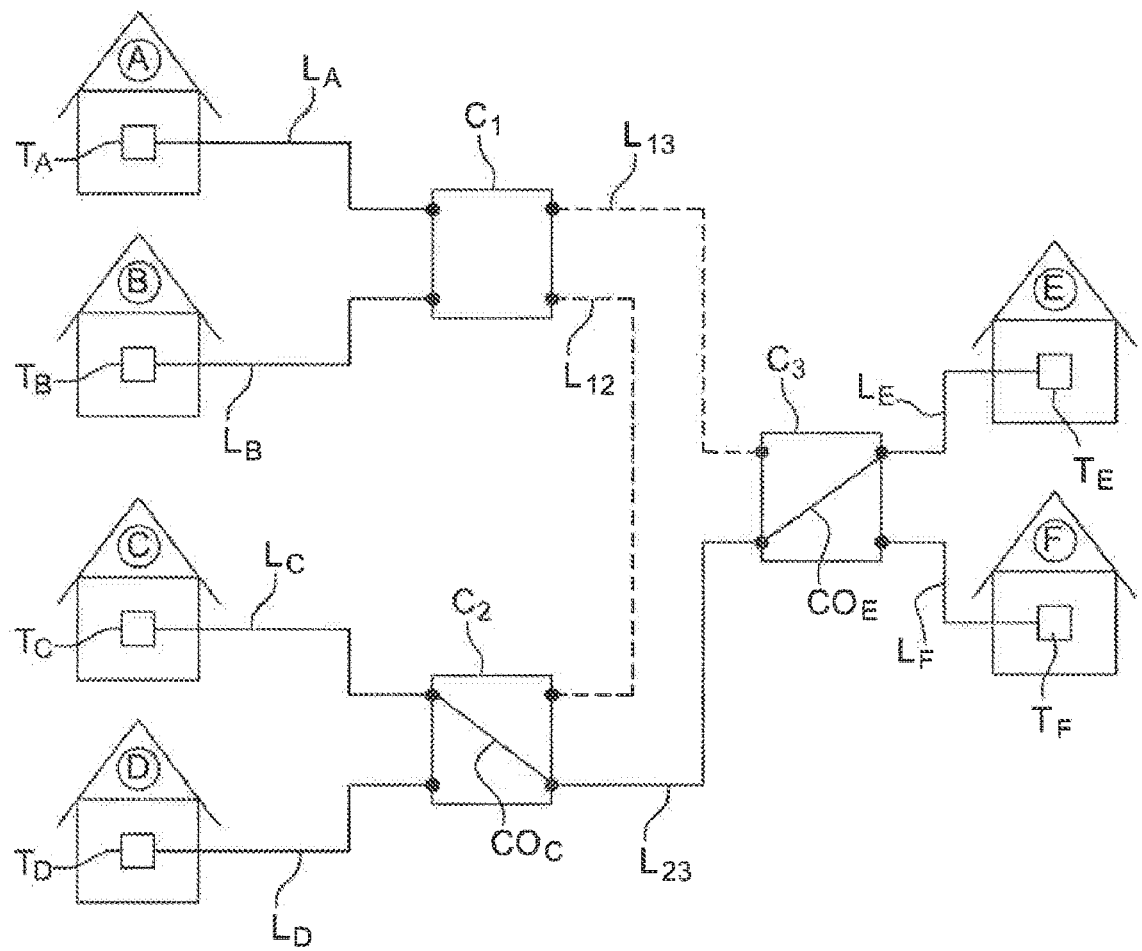
Figure 2:
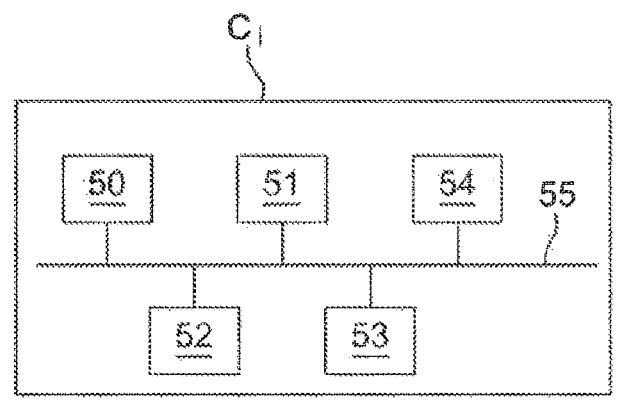

By referring to FIG. 1, each switch C, of the STN comprises, in particular, one or more processors or microprocessors 50, one or more memories 51, a network interface 52, one or more switching matrices 53, a database 54, which are mutually connected via a bus 55. One or more computer applications—or computer programs—are stored in the memory(ies) 51 and of which the instructions, when they are executed by the processor(s) 50 make is possible to perform the functionalities described above in the description.

The network interface 52 is a wired or wireless communication interface making it possible for the switches $C_1$, $C_2$ and $C_3$ to communicate together and/or to communicate with one or more remote computer servers, via a communication network with network technologies such as, but without being limited, Ethernet, GSM, EDGE, 2G, 3G, 4G, etc. The network can also be of the secure telecommunication network type (Internet, etc.) or virtual private network (VPN) to secure the exchange of data between the switches $C_1$, $C_2$ and $C_3$ and/or with the remote computer server(s). This exchange of data can also be performed through switched connections $L_{12}$, $L_{13}$, $L_{23}$.

The switching matrix 53 makes it possible to create a connection between a switched connection and a subscriber line, according to instructions executed by the processor(s) 50.

The database 54 can be hosted directly in the switch C. It can also be hosted outside of the switch $C_i$, for example in a remote computer server of said switch or in a Cloud Computing type server network.

In the database 54, a table is stored, wherein are associated the telephone numbers of which they manage and the corresponding subscriber lines. For example, in the STN of FIG. 1:

the table stored in the database of the switch $C_1$ associates:
  the number of the landline telephone $T_A$ to the subscriber line $L_A$;
  the number of the landline telephone $T_B$ to the subscriber line $L_B$.

the table stored in the database of the switch $C_2$ associates:
  the number of the landline telephone $T_C$ to the subscriber line $L_C$;
  the number of the landline telephone $T_D$ to the subscriber line $L_D$.

the table stored in the database of the switch $C_3$ associates:
  the number of the landline telephone $T_E$ to the subscriber line $L_E$;
  the number of the landline telephone $T_F$ to the subscriber line $L_F$.

The invention makes the use occur, of a removable housing B suitable for being connected to a subscriber line, in the premises (dwelling, room, office, etc.) where the landline telephone connected to said subscriber line. To revisit the preceding example, the housing B is installed in the premises of the subscriber A.

Figure 3:
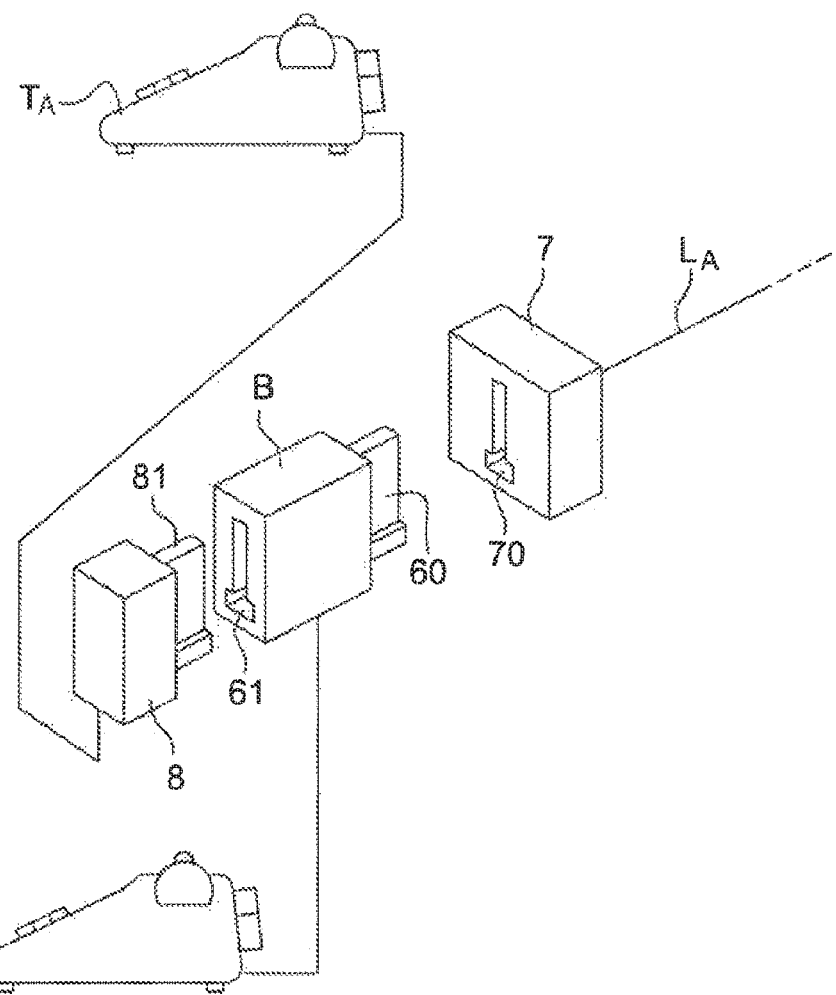
FIG. 3 illustrates a housing according to the invention, according to a first embodiment.
Figure 4:
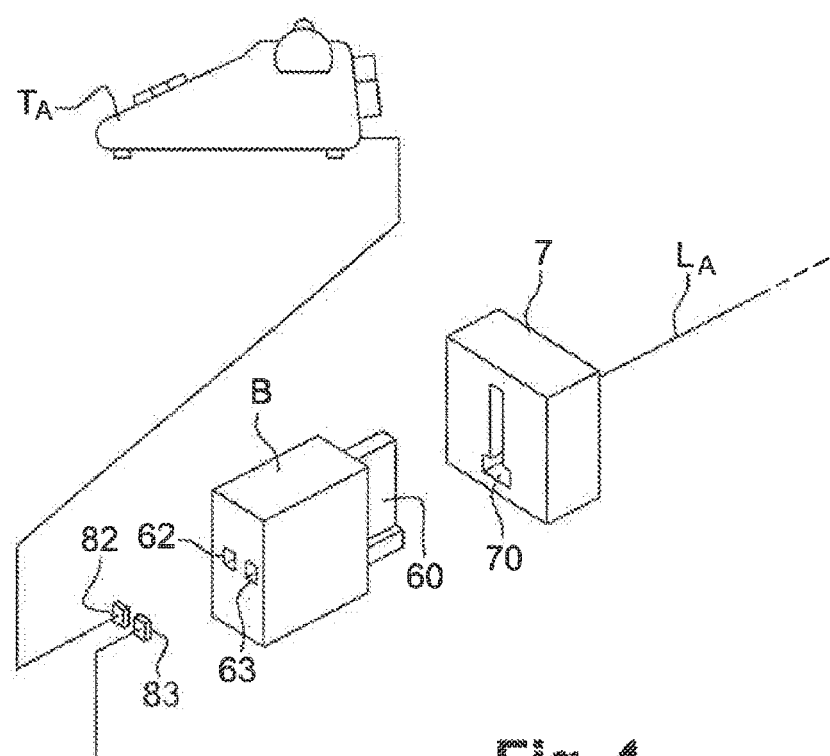
FIG. 4 illustrates a housing according to the invention, according to a second embodiment, FIG. 5 schematizes the arrangement of different components of a housing according to the invention.

The housing B can be of relatively reduced dimensions. In FIG. 3, it is presented advantageously in the form of a telephone plug adaptor. It comprises a male plug 60 which is connected into a female plug 70 of a wall socket 7 situated generally in the premises of the subscriber A. This wall socket 7 is the termination point of the subscriber line $L_A$, i.e. the physical access point by which the subscriber A obtains access to the STN. The housing B also comprises a female plug 61, wherein is connected the male plug 81 of a T-shaped socket connected to the landline telephone $T_A$. The landline telephone $T_C$ is connected to the housing B by way of a connector of the RJ11 or RJ45 type, for example. In FIG. 4, the landline telephones $T_A$ and $T_C$ are connected to the housing B by way of connectors 82, 83 of the RJ11 or RJ45 type which are inserted into complementary connectors 62, 63 arranged in said housing.

Figure 5:
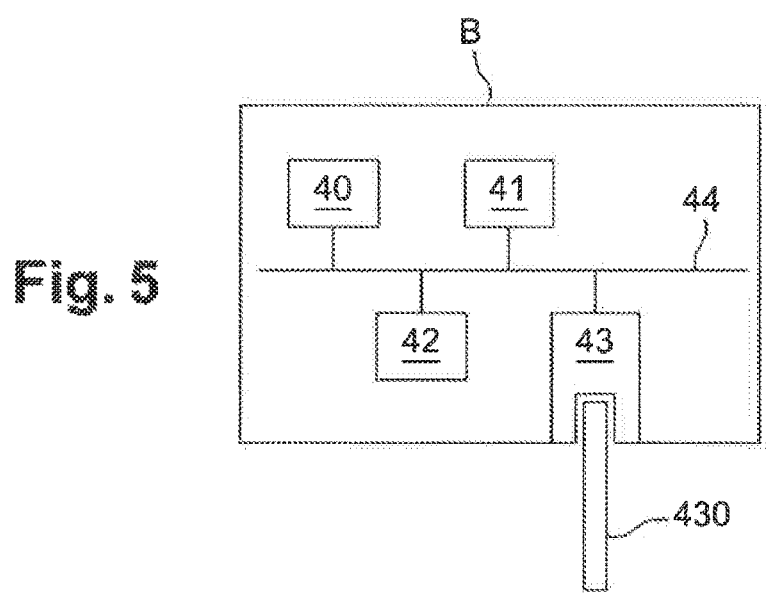

By referring to FIG. 5, the housing B comprises, in particular, one or more processors or microprocessors 40, optionally one or more memories 41, an access point 42, optionally a connection interface 43 for a smart card, SIM card, or USB stick, which are mutually connected via a bus 44. One or more computer applications—or computer programs—are stored in the memory(ies) 41 or in the smart card, SIM card, or USB stick, and of which the instructions, when they are executed by the processor(s) 40 make it possible to perform the functionalities described above in the description.

The memory(ies) 41 must be considered as a storage device, also suitable for storing data and/or datafiles. It can be a native memory or a returned memory such as a Secure Digital (SD) card.

The access point 42 is a wired or wireless communication interface suitable for establishing a communication with the landline telephone $T_C$. It can be a connection of the RJ11 or RJ45 type, as illustrated in FIGS. 3 and 4. In the case where the landline telephone $T_C$ is a digital enhanced cordless telecommunications (DECT) telephone, the access point 42 can, for example, comprise a Wi-Fi transmitter/receiver, a PLC (Power Line Carrier) connection, a Bluetooth module, or any other means capable of establishing a connection with said telephone.

The connection interface 43 is suitable for receiving a secure removable support 430 (smart card, SIM card, or USB stick), wherein is stored digital data. In practice, this digital data contains the telephone number associated with the landline telephone $T_C$ (below: the telephone number of the subscriber C). This telephone number can be stored in the secure removable support 430 when the subscriber C acquires this from a dedicated body. The connection interface 43 is optional insofar as the abovementioned digital data can be directly stored in the memory(ies) 41 when the subscriber C acquires the housing B.

First Embodiment

Figure 6:
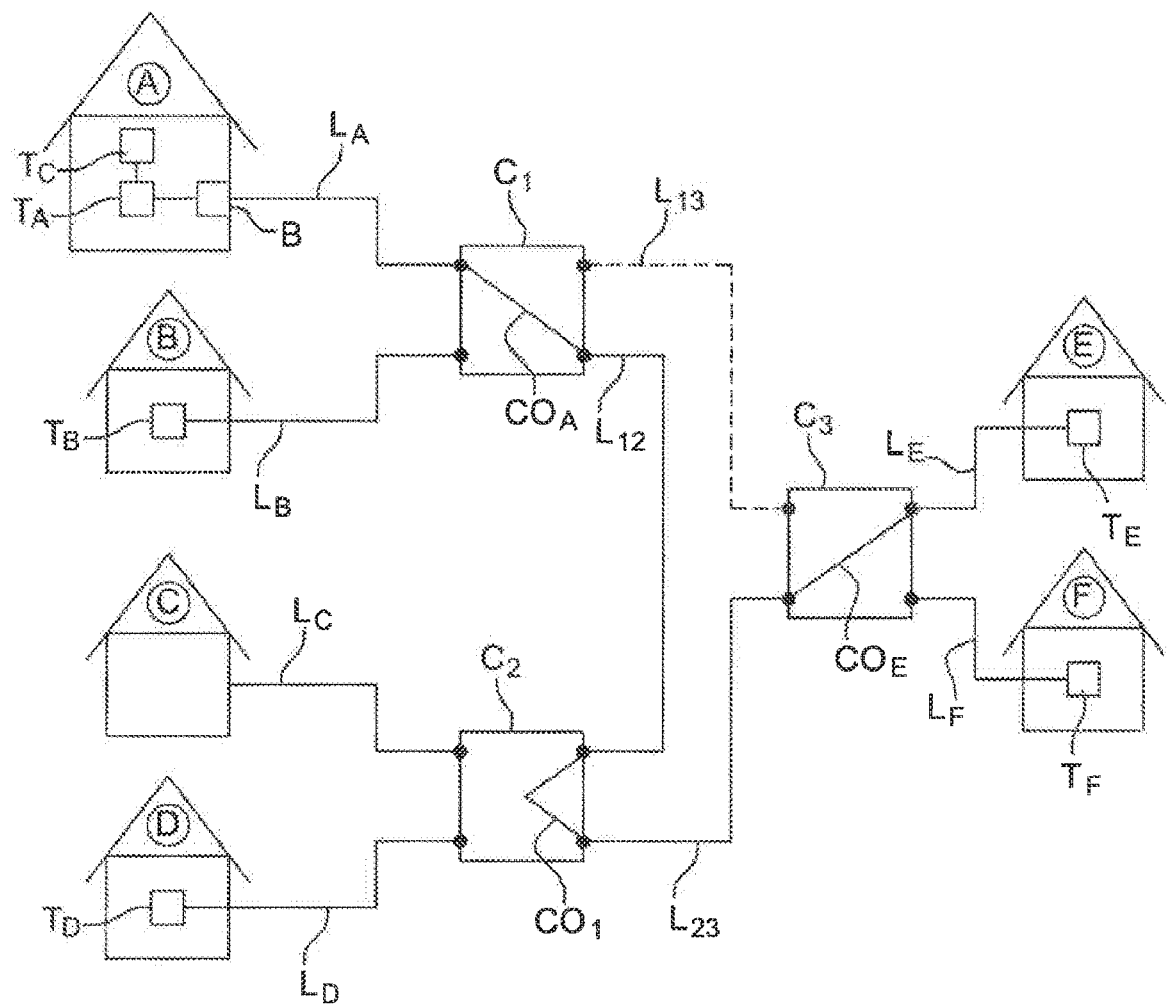
FIG. 6 illustrates a switched telephone network (STN) according to the invention.

FIG. 6 illustrates an STN where the subscriber A rents all or some of their premises to the subscriber C. The housing B is installed in the premises of the subscriber A, by cutting off the line as illustrated in FIGS. 3 and 4. This solution has the advantage, for the subscriber A, to conserve their landline telephone $T_A$. The housing B can be installed by the subscriber C during the installation thereof in the premises of the subscriber A. It can also be installed by the subscriber A, in particular when the housing B comprises the connection interface 43. The subscriber C must then insert their secure removable support 430 into the housing B, during the installation thereof in the premises of the subscriber A.

Figure 7:
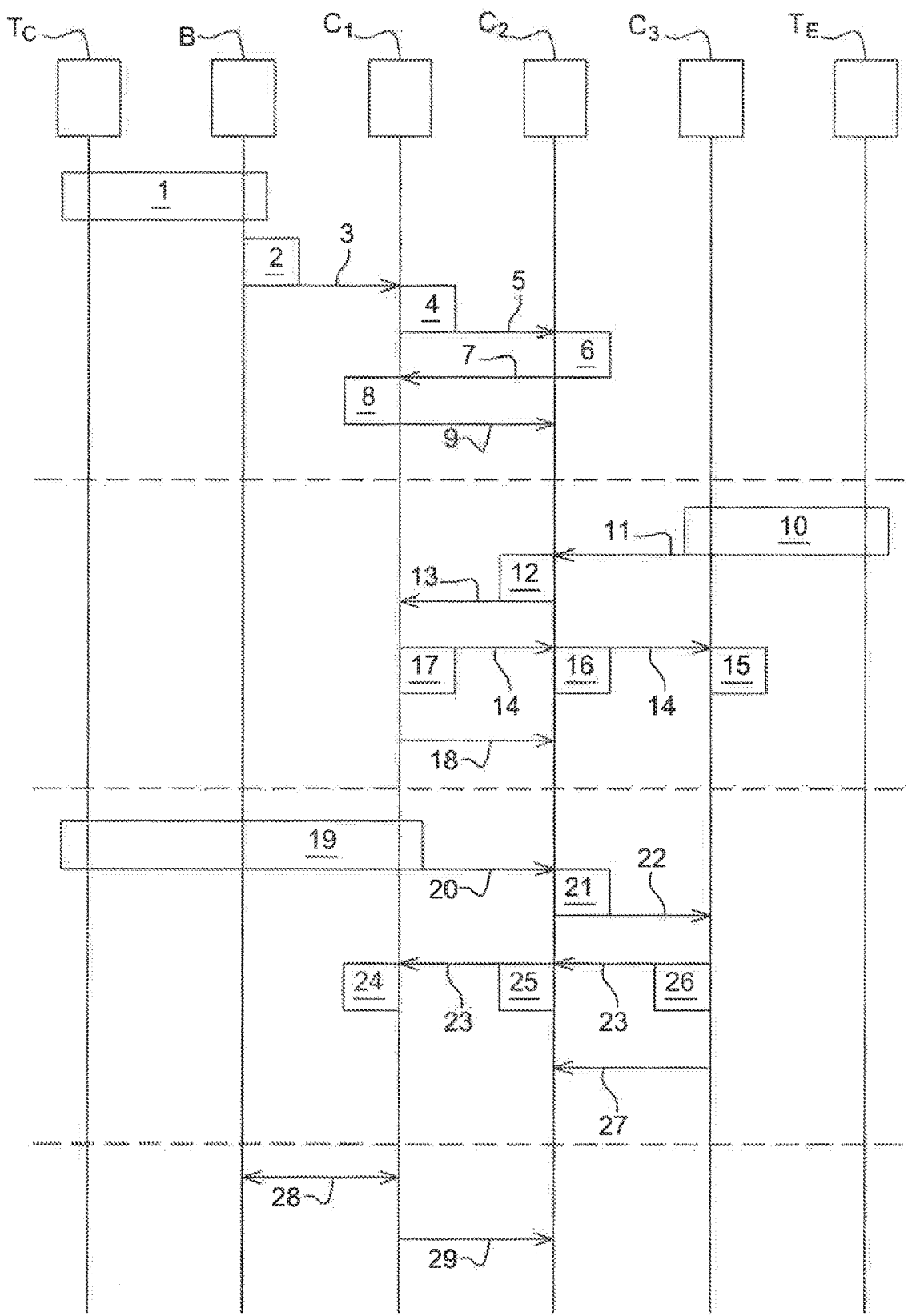
FIG. 7 illustrates different steps implemented in the method, which is the subject of the invention, in the STN of FIG. 6.

FIG. 7 illustrates different implementation steps in the method that is the subject of the invention and in the STN of FIG. 6.

Event 1: the landline telephone $T_C$ is connected to the housing B. This connection can be made before, during or after the event 2. In practice, the subscriber C is in possession of their landline telephone fixe $T_C$ when it is installed at the subscriber A's property.

Event 2: the housing B is connected in the premises of the subscriber A, cutting off the line, on the wall socket 7. If necessary, the subscriber C inserts their secure removable support 430 in the connection interface 43 of the housing B.

Step 3: the housing B generates and emits a presence request to the switch $C_1$ to which is connected the premises of the subscriber A. The connection of the housing B to the subscriber line $L_A$ and/or the insertion of the secure removable support 430 in the connection interface 43, is the element triggering the presence request. This presence request is transmitted to the switch $C_1$ via the subscriber line $L_A$. This requests contains, in particular, the telephone number of the subscriber C.

Event 4: the switch $C_1$ analyzes the telephone number of the subscriber C to seek the switch to which this number is affiliated. The first figures of the telephone number of the subscriber C give the routing address of the switch $C_2$.

Step 5: the switch $C_1$ generates and transmits to the switch $C_2$ an interrogation request aiming to verify that the telephone number of the subscriber C is actually affiliated with the switch $C_2$. The completion of event 4 is the element triggering the interrogation request. This interrogation request contains the telephone number of the subscriber C. The communication between the switches $C_1$ and $C_2$ can be made by way of the respective network interface 52 thereof or by the switched connection Lie (FIG. 6).

Event 6: the switch $C_2$ verifies that the telephone number of the subscriber C itself is actually affiliated. The reception of the interrogation request is the element triggering the verification procedure. In practice, this verification consists of interrogating the table stored in the database thereof.

Step 7: if the telephone number of the subscriber C is stored in the table, the switch $C_2$ generates and transmits an authentication signal to the switch $C_1$. Event 6 and step 7 give more security to the system but are optional insofar as they can be redundant with the analysis performed during event 4.

Event 8: in response to the reception of the authentication signal, the switch $C_1$ authorizes the attachment of the telephone number of the subscriber C to the subscriber line $L_A$. The latter is therefore shared between the telephone number of the subscriber A and the telephone number of the subscriber C. In other words, the table stored in the database of the switch $C_1$ associates to the subscriber line $L_A$, not only the number of the landline telephone $T_A$ but also the number of the landline number $T_C$. The subscriber line $L_A$ is therefore likely to simultaneously process the incoming/outgoing calls associated with the telephone number of the subscriber C and the incoming/outgoing calls associated with the telephone number of the subscriber A. The subscriber A can continue to emit and receive calls normally from their landline telephone $T_A$. The reception of the authentication signal is the element triggering this attachment. The reception of the presence request of step 3 can be this triggering element in the case where event 6 and step 7 are not implemented.

Step 9: the switch $C_1$ generates and transmits to the switch $C_2$ a command signal, demanding it in particular to systematically send back to the switch $C_1$ the incoming calls corresponding to the telephone number of the subscriber C. The command signal also demands it to charge the subscriber C when the outgoing calls passing through the switch $C_1$ are associated with the telephone number of the subscriber C.

The following steps and/or events concern the case of an incoming call corresponding to the telephone number of the subscriber C. For example, the subscriber E wants to call the subscriber C.

Event 10: the subscriber E picks up their telephone $T_E$ with the intention of calling their correspondent C. The switch $C_3$ detects the picking up of the telephone and alerts the subscriber E, by a continuous tone. The subscriber E dials the telephone number of the subscriber C, which numbering is detected on the subscriber line $L_C$. The switch $C_3$ determines the destination of the call. The first figures of the dialed number give the routing address of the switch $C_2$.

Step 11: the switch $C_3$ establishes with the switch $C_2$ a temporary switched connection $L_{23}$, and transmits to it the telephone number of the subscriber C.

Event 12: the switch $C_2$ analyzes the number transmitted and detects that the call is intended for the subscriber C.

Step 13: according to the command signal received in step 9, the switch $C_2$ establishes with the switch $C_1$ a temporary switched connection $L_{12}$, and transmits to it the telephone number of the subscriber C.

Step 14: when the subscriber C is available (i.e. that their telephone $T_C$ is not engaged), the switch $C_1$ sends back a signaling message to the switch $C_2$, through the switched connection $L_{12}$, indicating the progression of the call. The switch $C_2$ sends back this signaling message to the switch $C_3$, through the switched connection $L_{23}$.

Event 15: the switch $C_3$ reserves a connection $CO_E$ between the switched connection $L_{23}$ and the subscriber line $L_E$. The switch $C_3$ also activates the ringing of the telephone $T_E$ and generates a ringtone to the switch $C_2$.

Event 16: likewise, the switch $C_2$ reserves a connection $CO_1$ between the switched connection $L_{23}$ and the switched connection $L_{12}$. The ringtone is transmitted to the switch $C_1$.

Event 17: the switch $C_1$ also reserves a connection $CO_A$ between the switched connection $L_{12}$ and the subscriber line $L_A$. The subscriber E hears the tone corresponding to a ringing return. Events 15, 16 and 17 can be performed simultaneously or not, during or after step 14.

Step 18: when the subscriber C picks up the telephone $T_C$, the switch $C_1$ detects this picking up of the telephone and transmits to the switch $C_2$ a signal signaling to them, the start of the communication. This signal is retransmitted to the switch $C_3$ which can then start the charging of the subscriber E.

The following steps and/or events concern the case of an outgoing call emitted from the telephone $T_C$ connected to the housing B. For example, the subscriber C wants to call the subscriber E.

Event 19: the subscriber C picks up their telephone $T_C$ with the intention of calling their correspondent E. The switch $C_1$ detects the picking up of the telephone and alerts the subscriber C, by a continuous tone. An additional signal is transmitted to the subscriber line $L_A$, indicating that it is said telephone $T_C$ which is picked up. This signal can in particular contain the number of the subscriber C. The latter dials the telephone number of the subscriber E, which numbering is detected on the subscriber line $L_A$.

Step 20: the switch $C_1$ establishes with the switch $C_2$ a temporary switched connection $L_{12}$, and transmits to it the telephone number of the subscriber E. The switch $C_1$ also transmits to the switch $C_2$ a signal indicating to them that the outgoing call is associated with the telephone number of the subscriber C.

Event 21: the switch $C_2$ analyzes the number transmitted and detects that the call comes from the subscriber C. The switch $C_2$ determines the destination of the call, the first figures of the telephone number of the subscriber E, giving the routing address of the switch $C_3$. According to the command signal received in step 9, the switch $C_2$ implements the charging process of the subscriber C, if the call of the subscriber E succeeds.

Step 22: the switch $C_2$ establishes with the switch $C_3$ a temporary switched connection $L_{23}$, and transmits to it the telephone number of the subscriber E.

Step 23: when the subscriber E is available (i.e. that their telephone $T_E$ is not engaged), the switch $C_3$ sends back a signaling message to the switch $C_2$, through the switched connection $L_{23}$, indicating the progression of the call. The switch $C_2$ sends back this signaling message to the switch $C_1$, through the switched connection $L_{12}$.

Event 24: the switch $C_1$ reserves a connection $CO_A$ between the switched connection $L_{12}$ and the subscriber line $L_A$. The switch $C_1$ also activates the ringing of the telephone $T_C$ and generates a ringtone to the switch $C_2$.

Event 25: likewise, the switch $C_2$ reserves a connection $CO_1$ between the switched connection $L_{12}$ and the switched connection $L_{23}$. The ringtone is transmitted to the switch $C_3$.

Event 26: the switch $C_3$ also reserves a connection $CO_E$ between the switched connection $L_{23}$ and the subscriber line $L_E$. The subscriber C hears the tone corresponding to a ringing return. Events 24, 25 and 26 can be performed simultaneously or not, during or after step 23.

Step 27: when the subscriber E picks up the telephone $T_E$, the switch $C_3$ detects this picking up of the telephone and transmits to the switch $C_2$ a signal signaling to it the start of the communication which can then start the charging of the subscriber C.

The following steps and/or events concern the disconnection of the housing B and/or the removal of the secure removable support 430.

Step 28: when the housing B is disconnected from the wall socket 7 and/or the secure removable support 430 is removed from the connection interface 43, said housing and/or said secure removable support, generates and emits a disconnection signal to the switch $C_1$. The disconnection of the housing B and/or the removal of the secure removable support 430, is therefore the element triggering the disconnection signal. The housing B and/or the secure removable support 430 can, for example, automatically emit this disconnection signal.

This disconnection signal is transmitted via the subscriber line $L_A$. The switch $C_1$ can also interrogate the housing B and/or the secure removable support 430, by periodically transmitting to it presence requests ("are you there?"). While the housing B and/or the secure removable support 430 responds to these requests, the switch $C_1$ deduces from this that said housing is actually connected to the wall socket 7 and/or that the secure removable support 430 is actually inserted into the connection interface 43, and in the absence of any response, the switch $C_1$ deduces from this that the housing B is disconnected from the wall socket 7 and/or that the secure removable support 430 is removed from the connection interface 43. In another embodiment variant, it is the housing B and/or the secure removable support 430 which periodically transmits to the switch $C_1$ presence messages ("I am here"). While the switch $C_1$ receives these messages, it deduces from this that the housing B is actually connected to the wall socket 7 and/or that the secure removable support 430 is actually inserted into the connection interface 43, and in the absence of any reception of these messages, the switch $C_1$ deduces from this that the housing B is disconnected from the wall socket 7 and/or that the secure removable support 430 is removed from the connection interface 43.

Step 29: when the switch $C_1$ is informed of the disconnection of the housing B and/or of the removal of the secure removable support 430, it generates and transmits to the switch $C_2$, a session closure signal. The reception of the disconnection signal is the element triggering the session closure signal. The switch $C_1$ stops managing the calls corresponding to the telephone number of the subscriber C, which are then taken back, conventionally, by the switch $C_2$.

Second Embodiment

Figure 8:
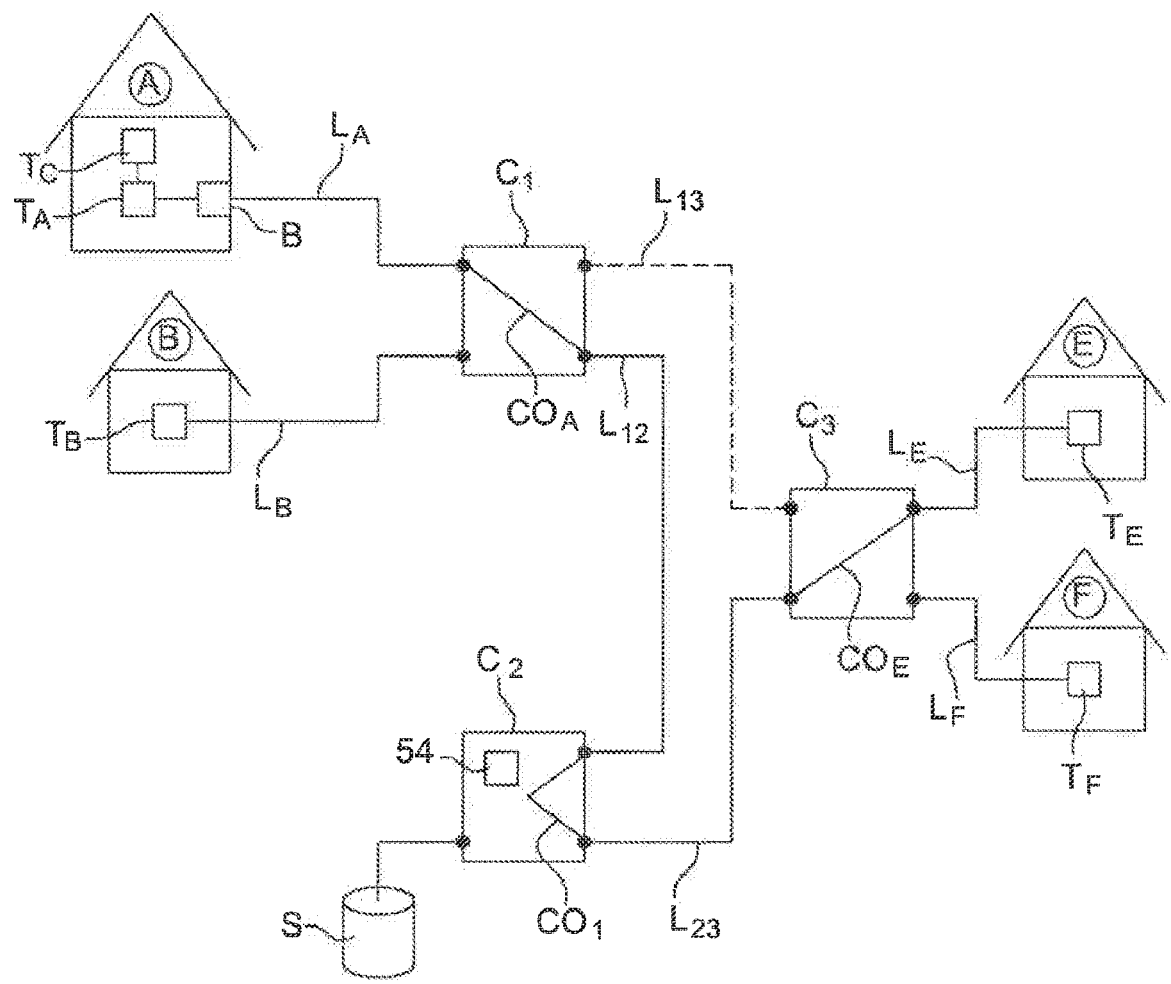
FIG. 8 illustrates a switched telephone network (STN) according to a second embodiment of the invention.

FIG. 8 illustrates an STN where the switch $C_2$ is not attached to any subscriber line. It is a switch shared between several subscribers, in particular the subscriber C. This switch $C_2$ is managed by a remote computer server S. The database 54 of the switch $C_2$ contains all the telephone numbers of the subscribers, shared and recorded with the server S, including the number of the subscriber C.

Figure 9:
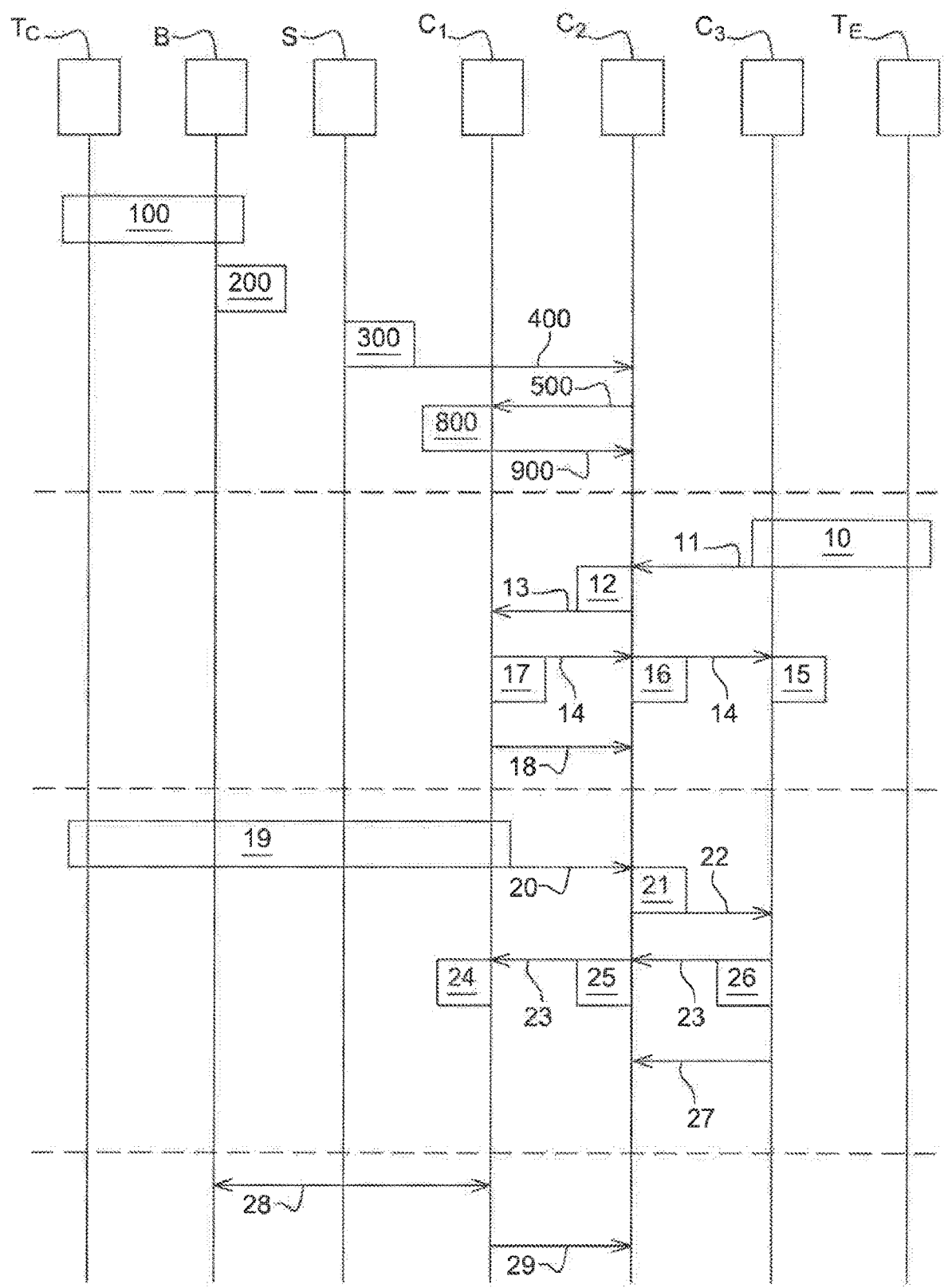
FIG. 9 illustrates different steps implemented in the method, which is the subject of the invention, in the STN of FIG. 8.

FIG. 9 illustrates different steps implemented in the method that is the subject of the invention and in the STN of FIG. 8.

Event 100: the landline telephone $T_C$ is connected to the housing B. This connection can be made before, during or after event 2. In practice, the subscriber C is in possession of their landline telephone $T_C$ when it is installed at the subscriber A's property.

Event 200: the housing B is connected in the premises of the subscriber A, cutting off the line, on the wall socket 7. If necessary, the subscriber C inserts their secure removable support 430 in the connection interface 43 of the housing B.

Event 300: the subscriber C is signaled and is authenticated to the server S. This signaling can be made by any means, such as: telephone call to the server S, by way of a Smartphone of the subscriber C or of the landline telephone $T_A$ or $T_C$; online recording of the subscriber C to the server S, actuation of a dedicated button arranged on the housing B, etc. The subscriber C thus accesses the server S and communicates an identifier to it (e.g. login and/or password) for their authentication.

The subscriber C also communicates to the server S, the telephone number associated with the landline telephone $T_A$ of the subscriber A. This telephone number can be manually input by the subscriber C via a communication interface accessible from the server S. The telephone number of the subscriber A can also be automatically transmitted to the server S, for example during the access to said server from the landline telephone $T_A$ or $T_C$. The server then automatically recognizes this telephone number and authenticates the subscriber C by furthermore verifying the digital data (in particular, the telephone number of the subscriber C) contained in the memory 41 of the housing B and/or in the secure removable support 430.

Step 400: the server S generates and emits a command instruction to the switch $C_2$ such that the latter transmits a presence request to the switch $C_1$.

Step 500: the switch $C_2$ generates and emits the presence request to the switch $C_1$ to which is connected the premises of the subscriber A. The reception of the command instruction is the element triggering the presence request. This presence request contains the telephone number of the subscriber C. The communication between the switches $C_1$ and $C_2$ can be made by way of the respective network interface 52 thereof or by switched connection $L_{12}$.

Event 800: in response to the reception of the presence request, the switch $C_1$ authorizes the attachment of the telephone number of the subscriber C to the subscriber line $L_A$. The latter is therefore shared between the telephone number of the subscriber A and the telephone number of the subscriber C. In other words, the table recorded in the database of the switch $C_1$ associates with the subscriber line $L_A$, not only the number of the landline telephone $T_A$ but also the number of the landline telephone $T_C$. The subscriber line $L_A$ is therefore likely to simultaneously process the incoming/outgoing calls associated with the telephone number of the subscriber C and the incoming/outgoing calls associated with the telephone number of the subscriber A. The subscriber A can continue to emit and receive calls normally from their landline telephone $T_A$. The reception of the authentication signal is the element triggering this attachment. The reception of the presence request of step 3 can be this triggering element in the case where event 6 and step 7 are not implemented.

Step 900: the switch $C_1$ generates and transmits to the switch $C_2$ a command signal, demanding it, in particular, to systematically send back to the switch $C_1$ the incoming calls corresponding to the telephone number of the subscriber C. The command signal also demands it to charge the subscriber C when the outgoing calls passing through the switch $C_1$ are associated with the telephone number of the subscriber C.

Steps and events 10 to 29 described above in reference to FIGS. 6 and 7 are also applied to this second embodiment.

In this second embodiment, the subscriber C can also recover private internet connection attributes to access complementary services to which they subscribe. Indeed, the subscriber C is now localized and authenticated on the subscriber line $L_A$. The server S can then make it possible for all or some of the computer equipment (tablets, PC, Box TV, etc.) connected to the internet service connected to the subscriber line $L_A$ to receive the complementary services to which the subscriber C subscribes (access rights to payable television channels, on-demand videos, etc.).

The arrangement of the different elements and/or means and/or steps of the invention, in the embodiments described above, must not be understood as requiring such an arrangement in all the implementations. In any case, it will be understood that various modifications can be applied to these elements and/or means and/or steps, without moving away from the sense and scope of the invention.

The invention claimed is:

1. Switched telephone network (STN) wherein:
   a first switch is connected to a first subscriber line suitable for connection to a first landline telephone installed in a premise of a first subscriber, said first subscriber line being associated with a telephone number assigned to said first telephone,
   a second switch comprising a database storing a telephone number assigned to a second landline telephone of a second subscriber,
   the network further comprising:
   a removable housing connected to the first subscriber line in the premises where the first telephone is installed, the second telephone being connected to said housing,
   a means or transmitting to the first switch a presence request containing the telephone number assigned to the second telephone, and
   the reception of the presence request by the first switch results in the automatic implementation of a logical computer process involving the second switch and resulting in the sharing of the first subscriber line, through the housing, between the telephone number assigned to the first telephone and the telephone number assigned to the second telephone.

2. Switched telephone network according to claim 1, wherein the reception of the presence request by the first switch results in the emission of a signal commanding the second switch such that it sends back to said first switch, the incoming calls corresponding to the telephone number assigned to the second telephone.

3. Switched telephone network according to claim 2, wherein the second switch establishes a temporary switched connection between the two switches when said second switch receives an incoming call corresponding to the telephone number assigned to the second telephone.

4. Switched telephone network according to claim 1, wherein the presence request is emitted by the housing through the first subscriber line.

5. Switched telephone network according to claim 1, wherein the presence request is emitted by the second switch, in response to a command instruction emitted by a remote computer server.

6. Switched telephone network according to claim 5, wherein the command instruction is emitted by the remote computer server in response to a signaling and an authentication of the second subscriber to said server.

7. Switched telephone network according to claim 1, wherein the reception of the presence request by the first switch results in a signal commanding the second switch such that it automatically implements a process for charging the second subscriber when an outgoing call is emitted from the second telephone connected to the housing.

8. Switched telephone network according to claim 7, wherein:
   picking up of the second telephone results in the transmission of a signal emitted by the housing to the first switch through the first subscriber line, and
   the reception of said signal by the first switch results in the automatic implementation of a logical computer process resulting in the establishment of a temporary switched connection between the two switches such that the second switch processes the outgoing calls emitted from the second telephone connected to the housing.

9. Switched telephone network according to claim 1, wherein:
   the telephone number assigned to the second telephone is recorded in a secure removable support, and
   the housing is equipped with a connection interface suitable for receiving the secure removable support.

10. Switched telephone network according to claim 9, wherein the insertion of the secure removable support in the connection interface results in the transmission of the presence request by the housing.

11. Switched telephone network according to claim 9, wherein the removal of the secure removable support from the connection interface results in the automatic implementation of a logical computer process resulting in the stopping of the sharing of the first subscriber line.

12. Switched telephone network according to claim 1, wherein the disconnection of the housing of the first subscriber line results in the automatic implementation of a logical computer process resulting in the stopping of the sharing of said first subscriber line.

13. Switched telephone network according to claim 1, wherein the housing is presented in the form of a telephone plug adaptor, and comprises:
   a male plug suitable for being connected into a female plug of a wall socket situated in the premises of the first subscriber, which wall socket is connected to the first subscriber line,
   a female plug suitable for receiving the male plug of a T-shaped socket connected to the first telephone, and
   a connector to which is connected the second telephone.

14. Switched telephone network according to claim 1, wherein the housing is presented in the form of a telephone plug adaptor, and comprises:
   a male plug suitable for being connected into a female plug of a wall socket situated in the premises of the first subscriber, which wall socket is connected to the first subscriber line,
   a connector to which is connected the first telephone, and
   a connector to which is connected the second telephone.

15. A method for managing a subscriber line in a switched telephone network, which network comprises:
   a first switch connected to a first subscriber line suitable for connection to a first landline telephone installed in a premise of a first subscriber, said first subscriber line being associated with a telephone number assigned to said first telephone, and
   a second switch comprising a database, storing a telephone number assigned to a second landline telephone of a second subscriber,
   the method further comprising:
   connecting a removable housing to the first subscriber line, in the premises where the first telephone is installed,
   connecting the second telephone to the housing,
   transmitting to the first switch a presence request containing the telephone number assigned to the second telephone, and
   the reception of the presence request by the first switch results in the automatic implementation of a logical computer process involving the second switch and resulting in the sharing of the first subscriber line, through the housing, between the telephone number assigned to the first telephone and the telephone number assigned to the second telephone.

\* \* \* \* \*